United States Patent
Kintner et al.

(10) Patent No.: US 6,732,079 B1
(45) Date of Patent: May 4, 2004

(54) METHOD OF DETERMINING THE BEST MIX OF REGULAR AND CONTRACT EMPLOYEES

(75) Inventors: Hallie J. Kintner, Ann Arbor, MI (US); Eleanor M. Feit, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/431,251

(22) Filed: Nov. 1, 1999

(51) Int. Cl.$^7$ .............................................. G06F 17/60
(52) U.S. Cl. ................................... 705/8; 705/9; 705/7
(58) Field of Search .................................... 705/9, 8, 7

(56) References Cited

U.S. PATENT DOCUMENTS

| | | | | |
|---|---|---|---|---|
| 5,117,353 A | * | 5/1992 | Stipanovich et al. ............ | 705/1 |
| 5,325,292 A | * | 6/1994 | Crockett ....................... | 705/10 |
| 5,765,140 A | * | 6/1998 | Knudson et al. ................ | 705/9 |
| 5,884,276 A | * | 3/1999 | Zhu et al. ..................... | 705/7 |
| 5,911,134 A | * | 6/1999 | Castonguay et al. ............ | 705/9 |
| 5,913,201 A | | 6/1999 | Kocur .......................... | 705/9 |
| 6,219,649 B1 | * | 4/2001 | Jameson ........................ | 705/8 |
| 6,275,812 B1 | * | 8/2001 | Haq et al. ..................... | 705/11 |

FOREIGN PATENT DOCUMENTS

| | | | | |
|---|---|---|---|---|
| JP | 401180667 | * | 7/1998 | G06F/15/21 |
| WO | W.O. 01/03034 A1 | * | 7/1999 | G06F/17/60 |

OTHER PUBLICATIONS

"Investors are Failing to Recognize the Surprisingly Good Earnings Performance that Steel Companies will Experience". PR Newswire. Dec. 13, 1998.*

"Synar Adds Contracting as Area of Superfund Waste". Pesticide & Toxic Chemical News, Vol, 20. Iss, 24. Apr. 15, 1992.*

* cited by examiner

*Primary Examiner*—Tariq R. Hafiz
*Assistant Examiner*—Rebecca M. Bachner
(74) *Attorney, Agent, or Firm*—Kathryn A. Marra

(57) ABSTRACT

A process is disclosed for implementation on a suitably programmed digital computer for producing a worker staffing plan for an organization over a long-term workload forecast when the organization employs workers of different employment relation types, such as regular employees, both full and part time, and contract employees hired from another concern. Data is entered into the computer pertaining to (a) the work forecast; (b) types of employees, including the productivity, training cost, annual cost and termination cost of each type; (c) demographic data, where available and appropriate, for each type such as worker age and experience or length of service; and (d) attrition or retention data for each employment type by demographic group. A linear programming analysis is then conducted on the computer to produce a hiring and termination schedule for each worker type for each work period to meet the workload requirements of the organization at minimum cost.

5 Claims, No Drawings

METHOD OF DETERMINING THE BEST MIX OF REGULAR AND CONTRACT EMPLOYEES

TECHNICAL FIELD

This invention pertains to the determination of suitable, low cost mixes of different employee types, such as mixes of regular employees and contract employees, to accomplish varying estimated quantities of work over a substantial forecast period.

BACKGROUND OF THE INVENTION

There is a trend in business organizations toward purchasing services from outside suppliers (contracting out) since at least 1980. For example, the W. E. Upjohn Institute for Employment Research found that 44% of employers in the United States use independent contract workers. Many employers predict even greater use of contract employees and other flexible staffing arrangements in the future.

Most employers hire contract workers to handle workload fluctuations and absences of regular staff. Some employers blend full-time and contract employees for greater cost control, improved productivity, and improved customer service. Employers also turn to contract labor for specialized skills possessed by the outside contractors. For example, janitorial, machine maintenance, engineering and drafting, accounting, and computer skills are frequently obtained using contract employees.

In manufacturing industries like the automobile industry, engineering design departments are often faced with the need to blend the regular employees of the company with employees supplied by outside contractors. Engineering design departments typically operate under strict headcount limits for regular employees and contract with an engineer supply firm for the remainder of a temporary workforce. A manufacturing company limits its salaried headcount, in part, because of the tremendous long-term expense that a regular workforce represents. Such a company usually offers a substantial compensation package for its regular employees so as to be competitive with other industrial companies. Thus, its employee retention levels exceed those of other companies. The high retention level results in very long average work lives for salaried employees. A large salaried workforce with long average work lives and high compensation translates into huge future costs for the company.

The second reason to use contract employees is to keep employees "off the books." Information about the number of employees at a company is widely disseminated and frequently mentioned by stock analysts. To achieve desirable levels, senior management often establishes a corporate headcount target. The corporate headcount target is broken down into targets for every group, division, staff, and department. Each department head is provided a headcount target and a dollar budget. Few, if any, limits are established for contract employees in the corporate budgeting process.

On the other hand, there are many important reasons to limit the use of contracting. Contract employees generally cost more per year than regular employees do. Contract employees also typically have significantly higher attrition rates, which disrupts projects and increases recruiting and training costs.

To limit these negative effects, engineering management sets goals for the maximum percentage of the engineering workforce that should be made up of contract employees (leveraging percentage). These goals are based on the strategic importance of each area of engineering. In general, management believes that areas where a company is creating new knowledge and areas that require critical skills should not rely on contractors. For instance, functions with few critical skills, such as data conversion, are 80–100% staffed by contract employees. Leading edge areas of a corporation's business and competitive interests should use a minimum of contract workers.

In some cases, the headcount limits set by senior management to limit liability and keep employees "off the books" are in direct conflict with engineering management's desire to use regular employees for critical areas. This conflict leads managers to ask the following questions. What is the optimal mix of contract and regular employees? How much do headcount limits increase staffing costs?

Accordingly, it would be desirable for organizations mixing contract and regular employees to develop a decision support tool that determines the minimum-cost staffing plan. It is an object of this invention to provide such a decision support tool within a framework of linear programming.

SUMMARY OF THE INVENTION

This invention provides a procedure to be practiced on a suitably programmed computer for determining a low cost mix of available different types of employees, for example, regular employees and contract employees, in an operation to produce the workload requirements of the concern.

Large engineering and manufacturing concerns, for example, may require hundreds or thousands of employees to fulfill their workload requirements. And the workload requirements may vary significantly over a period of months or years. Such concerns usually use workers having different employment arrangements such as those described above. It is a significant problem to determine a suitable balance of the different types of workers to achieve the varying work output of the organization at a minimum cost of hiring, training, using and terminating employees under such differing working arrangements.

This invention identifies long term workload requirements of an organization in combination with certain characteristics of different worker types and capabilities. The invention organizes the requirements and characteristics in a computer database suitable for linear programming analysis to determine an optimal number of each worker type for each period of months or years within the forecast time. In accordance with the invention, a method is provided that accomplishes such an analysis.

The subject method starts with the preparation of a long-term work forecast of an organization in which there are substantial changes in workload from month to month or year to year. The estimated work requirements by forecast period are entered into the database of a computer using a suitable application program such as, e.g., Microsoft Excel® or the like.

Each suitable potential worker type available to perform the forecast work, such as full time regular employee, part time regular employee or contract employee is identified. Preferably this analysis is undertaken for a single specific job, such as engineering designer. Data is entered into the computer database identifying each such worker type. If there are differences in productivity between worker types, productivity values are entered into the database. Data concerning the costs of supporting each type of worker are entered into the database. Examples of relevant costs include the training costs, the wages or operating costs, and termination costs of each type.

In addition to cost data, the process of this invention uses certain demographic data in order to estimate attrition rates for the worker types to be employed. This analysis is applicable to sufficiently large worker populations where attrition rates can be used with confidence. Accordingly, the process includes entering into the computer database (when known and if appropriate) demographic data comprising worker age demographic groups, worker length of service demographic groups, and the number of workers of each worker type in each said demographic group currently employed by the organization. Using these demographic categories, an attrition rate, based on the employment experience of said organization, is entered into the database for each combination of worker type and demographic group.

After entry of the worker type, cost data and attrition data, a linear program analysis is used to determine the low cost population combination of each type of worker to accomplish the work output for each work period. The analysis will produce the number of workers of each type that must be maintained, hired, trained or terminated during each period. Finally, a summary is prepared for each month or year under analysis stating such numbers of workers and the respective costs.

Linear programming has been developed and used for nearly 50 years as a mathematical approach to the general and widespread problem of allocating limited resources among competing activities or needs in an optimal way. It uses a mathematical model consisting of linear equations and inequalities to describe the problem of concern. The word "linear" means that all the mathematical functions in the model are required to be linear functions. The word "programming" in linear programming is a synonym for planning or analysis, and the analysis is done mathematically using, as stated, linear equations and linear inequalities as constraints on the equations. In a typical linear programming problem, trial solutions are tested iteratively to reach a optimal solution to the linear equation(s) that constitute the model.

In accordance with the subject invention, a set of parameters have been identified for use in a linear programming analysis of the regular employee-contract employee population balancing type problem. Furthermore, an illustrative set of linear equations and constraints are disclosed and applied in an illustration of a specific embodiment of the invention.

Other objects and advantages of the invention will become apparent from the following description of an illustrative preferred embodiment.

DESCRIPTION OF A PREFERRED EMBODIMENT

Following is a linear programming representation of an optimization problem for regular/contract workforce planning that can assist in determining the best staffing strategy for a particular situation. This problem representation can be solved to determine the minimum-cost plan that will meet the workforce requirements. As input, the problem requires a complete set of data on workload, workforce costs, productivity and demographics. Once this data is entered, the model is solved to determine the optimal plan using standard linear programming software. This plan consists of the number of employees to hire and terminate in each year of a ten-year, or other selected, planning horizon.

There are at least two potential uses for this model. First, it can be used to direct staffing policy in any organization. Finding the minimum-cost staffing plan would be an arduous chore without such an automatic tool. By knowing what the minimum-cost strategy is, management can make more informed choices.

A second use of this model is to determine the cost of the management policies such as headcount limits. To observe the effects of these policy constraints, the user can enter data on these policies. The model will then report the minimum-cost plan that will meet the additional policy constraints. Since these policies restrict the number of plans that can be considered, they can only serve to maintain or increase the cost of the plan. (They may, however, improve the performance of the plan on measures other than cost.) The model is an excellent tool for playing "what if" games to learn about the impacts of such policy constraints.

The data used in the process is to be input into computer memory in a form suitable for linear programming analysis. Thus, mathematical notation such as the following can be employed.

There are four indices used to describe the worker type groups, the worker length of service groups and the worker hiring age groups. The notation for these indices is as follows:

Indices i ranges over the set I of available employee types, i.e. regular and contract.

j ranges over the set $\{H^{min}, \ldots, H^{max}\}$ where $H^{min}$ and $H^{max}$ are the minimum and maximum hiring ages groups. j normally is a range of ages, e.g., 25–29 years.

k ranges over $\{0, \ldots, S\}$ where S is the maximum length of service in years for any employee.

t ranges over the set $\{0, \ldots, T\}$ where T is the maximum length of the planning horizon. Each period, t, can represent any unit of time such as one month or one year.

The following mathematical notation is used to describe the data to be input into the computer database:

Input Data on Workforce Costs $c^x_{ijk}$=one-period cost of an employee of type i hired while in age group j who has k years of service (including salary, benefits, contract costs, ongoing training, etc.)

$c^y_i$=cost of hiring an employee of type i $c^z_{ijk}$=cost of terminating an employee of type i who was hired while in age group j and has k years of service Following is a specific example of a staffing problem involving different types of employees. In this example only two types of employees, regular and contract employees, are considered for simplicity of illustration. However, only a single type of job, for example, an engineering designer is treated in the problem. Also in this example, it is assumed that a startup company is involved that initially has no engineering designer employees, regular, contract or other. However, the company does have data of the type used in this example.

Tables 1 and 2 show an example set of input cost data for workforce costs. The costs are in thousands of dollars per year per employee. Table 1 summarizes hiring costs and annual salaries for employees with engineering design experience levels. Table 2 presents similar data for termination costs by experience level for regular and contract employee engineering designers. Table 2 also is broken down into age categories to illustrate this possibility, and there is pay variation by age group.

TABLE 1

Input Data on Employee Costs - Hiring and Annual Costs

| Worker Years of Service | Regular Employee Hiring Cost (Recruiting, Training) | Regular Employee Cost per Year (Wages, Benefits, Training, etc.) Hired at age | | | | | | | | Contract Employee Hiring Cost Hired at any age | Contract Employee Cost per Year (Contract Costs) Hired at any age |
|---|---|---|---|---|---|---|---|---|---|---|---|
| | | 15–19 | 20–24 | 25–29 | 30–34 | 35–39 | 40–44 | 45–49 | 50+ | | |
| 0 | 22 | 40 | 42 | 45 | 48 | 50 | 54 | 57 | 60 | 22 | 96 |
| 1 | | 42 | 44 | 47 | 50 | 53 | 56 | 59 | 63 | | 96 |
| 2 | | 43 | 46 | 49 | 52 | 55 | 58 | 61 | 65 | | 96 |
| 3 | | 45 | 48 | 51 | 54 | 57 | 60 | 64 | 68 | | 96 |
| 4 | | 47 | 50 | 53 | 56 | 59 | 63 | 66 | 70 | | 96 |
| 5 | | 49 | 52 | 55 | 58 | 61 | 65 | 69 | 73 | | 96 |
| 6 | | 51 | 54 | 57 | 60 | 64 | 68 | 72 | 76 | | 96 |
| 7 | | 53 | 56 | 59 | 63 | 66 | 70 | 75 | 79 | | 96 |
| 8 | | 55 | 58 | 62 | 65 | 69 | 73 | 78 | 82 | | 96 |
| 9 | | 57 | 60 | 64 | 68 | 72 | 76 | 81 | 86 | | 96 |
| 10 | | 59 | 63 | 67 | 71 | 75 | 79 | 84 | 89 | | 96 |
| 11 | | 62 | 65 | 69 | 73 | 78 | 82 | 87 | | | 96 |
| 12 | | 64 | 68 | 72 | 76 | 81 | 86 | 91 | | | 96 |
| 13 | | 67 | 71 | 75 | 79 | 84 | 89 | 94 | | | 96 |
| 14 | | 69 | 73 | 78 | 82 | 87 | 93 | 98 | | | 96 |
| 15 | | 72 | 76 | 81 | 86 | 91 | 94 | 102 | | | 96 |
| 16 | | 75 | 79 | 84 | 89 | 92 | 95 | | | | 96 |
| 17 | | 78 | 83 | 88 | 90 | 93 | 96 | | | | 96 |
| 18 | | 81 | 86 | 88 | 91 | 94 | 96 | | | | 96 |
| 19 | | 84 | 87 | 89 | 92 | 95 | 97 | | | | 96 |
| 20 | | 85 | 88 | 90 | 93 | 96 | 98 | | | | 96 |
| 21 | | 86 | 88 | 91 | 94 | 97 | | | | | |
| 22 | | 87 | 89 | 92 | 95 | 98 | | | | | |
| 23 | | 88 | 90 | 93 | 96 | 98 | | | | | |
| 24 | | 89 | 91 | 94 | 97 | 99 | | | | | |
| 25 | | 89 | 92 | 95 | 98 | 100 | | | | | |
| 26 | | 90 | 93 | 96 | 99 | | | | | | |
| 27 | | 91 | 94 | 97 | 100 | | | | | | |
| 28 | | 92 | 95 | 98 | 101 | | | | | | |
| 29 | | 93 | 96 | 99 | 102 | | | | | | |
| 30 | | 94 | 97 | 100 | 103 | | | | | | |
| 31 | | 95 | 98 | 101 | | | | | | | |
| 32 | | 96 | 98 | 102 | | | | | | | |
| 33 | | 96 | 98 | 103 | | | | | | | |
| 34 | | 96 | 98 | 104 | | | | | | | |
| 35 | | 96 | 98 | 105 | | | | | | | |
| 36 | | 96 | 98 | | | | | | | | |
| 37 | | 96 | 98 | | | | | | | | |
| 38 | | 96 | 98 | | | | | | | | |
| 39 | | 96 | 98 | | | | | | | | |
| 40 | | 96 | 98 | | | | | | | | |
| 41 | | 96 | | | | | | | | | |
| 42 | | 96 | | | | | | | | | |
| 43 | | 96 | | | | | | | | | |
| 44 | | 96 | | | | | | | | | |
| 45 | | 96 | | | | | | | | | |
| 46 | | 96 | | | | | | | | | |
| 47 | | 96 | | | | | | | | | |
| 48 | | 96 | | | | | | | | | |

TABLE 2

Input Data on Employee Costs - Termination Costs

| Worker Years of Service | Regular Employee Termination Costs (Severance Package) Hired at age | | | | | | | | Contract Employee Termination Costs Hired at any age |
|---|---|---|---|---|---|---|---|---|---|
| | 15–19 | 20–24 | 25–29 | 30–34 | 35–39 | 40–44 | 45–49 | 50+ | |
| 0 | 20 | 20 | 20 | 20 | 20 | 20 | 20 | 20 | 0 |
| 1 | 21 | 21 | 21 | 21 | 21 | 21 | 21 | 21 | 0 |
| 2 | 22 | 22 | 22 | 22 | 22 | 22 | 22 | 22 | 0 |
| 3 | 22 | 22 | 22 | 22 | 22 | 22 | 22 | 22 | 0 |
| 4 | 23 | 23 | 23 | 23 | 23 | 23 | 23 | 23 | 0 |
| 5 | 24 | 24 | 24 | 24 | 24 | 24 | 24 | 24 | 0 |
| 6 | 25 | 25 | 25 | 25 | 25 | 25 | 25 | 25 | 0 |
| 7 | 26 | 26 | 26 | 26 | 26 | 26 | 26 | 26 | 0 |
| 8 | 27 | 27 | 27 | 27 | 27 | 27 | 27 | 27 | 0 |
| 9 | 28 | 28 | 28 | 28 | 28 | 28 | 28 | 28 | 0 |
| 10 | 30 | 30 | 30 | 30 | 30 | 30 | 30 | 30 | 0 |
| 11 | 31 | 31 | 31 | 31 | 31 | 31 | 31 | | 0 |
| 12 | 32 | 32 | 32 | 32 | 32 | 32 | 32 | | 0 |
| 13 | 33 | 33 | 33 | 33 | 33 | 33 | 33 | | 0 |
| 14 | 35 | 35 | 35 | 35 | 35 | 35 | 35 | | 0 |
| 15 | 36 | 36 | 36 | 36 | 36 | 35 | 35 | | 0 |
| 16 | 37 | 37 | 37 | 37 | 37 | 35 | | | 0 |
| 17 | 39 | 39 | 39 | 39 | 37 | 35 | | | 0 |
| 18 | 41 | 41 | 41 | 39 | 37 | 35 | | | 0 |
| 19 | 42 | 42 | 41 | 39 | 37 | 35 | | | 0 |
| 20 | 44 | 44 | 41 | 39 | 37 | 35 | | | 0 |
| 21 | 46 | 44 | 41 | 39 | 37 | | | | |
| 22 | 47 | 44 | 41 | 39 | 37 | | | | |
| 23 | 49 | 44 | 41 | 39 | 37 | | | | |
| 24 | 49 | 44 | 41 | 39 | 37 | | | | |
| 25 | 49 | 44 | 41 | 39 | 37 | | | | |
| 26 | 49 | 44 | 41 | 39 | | | | | |
| 27 | 49 | 44 | 41 | 39 | | | | | |
| 28 | 49 | 44 | 41 | 39 | | | | | |
| 29 | 49 | 44 | 41 | 39 | | | | | |
| 30 | 49 | 44 | 41 | 39 | | | | | |
| 31 | 49 | 44 | 41 | | | | | | |
| 32 | 49 | 44 | 41 | | | | | | |
| 33 | 49 | 44 | 41 | | | | | | |
| 34 | 49 | 44 | 41 | | | | | | |
| 35 | 49 | 44 | 41 | | | | | | |
| 36 | 49 | 44 | | | | | | | |
| 37 | 49 | 44 | | | | | | | |
| 38 | 49 | 44 | | | | | | | |
| 39 | 49 | 44 | | | | | | | |
| 40 | 49 | 44 | | | | | | | |
| 41 | 49 | | | | | | | | |
| 42 | 49 | | | | | | | | |
| 43 | 49 | | | | | | | | |
| 44 | 49 | | | | | | | | |
| 45 | 49 | | | | | | | | |
| 46 | 49 | | | | | | | | |
| 47 | 49 | | | | | | | | |
| 48 | 49 | | | | | | | | |

In addition to cost data, information concerning expected workload and employee productivity is used in the subject process.

Input Data on Workload and Productivity $w_{ijk}$=number units of work produced in one year by an employee of type i who was hired while in age group j and has k years of service $W_t$=number of units of work to be completed by the workforce in planning period t Tables 3 and 4 show and example set of input data on workload and productivity.

TABLE 3

Input Data on Workload

| Planning Period | 1 | 2 | 3 | 4 | 5 | 6 | 7 | 8 | 9 | 10 |
|---|---|---|---|---|---|---|---|---|---|---|
| Number of Units of Work Required | 1982 | 1915 | 1873 | 1688 | 1577 | 1383 | 1273 | 1297 | 1066 | 1009 |

TABLE 4

Input data on Employee Productivity

| Worker Years of Service | Regular Employee Units of Work Produced Per Year Hired at age | | | | | | | | Contract Employee Units of Work Produced Per Year |
|---|---|---|---|---|---|---|---|---|---|
| | 15–19 | 20–24 | 25–29 | 30–34 | 35–39 | 40–44 | 45–49 | 50+ | Hired at any age |
| 0 | 0.90 | 0.90 | 0.90 | 0.90 | 0.90 | 0.90 | 0.90 | 0.90 | 0.90 |
| 1 | 0.94 | 0.94 | 0.94 | 0.94 | 0.94 | 0.94 | 0.94 | 0.94 | 0.91 |
| 2 | 0.97 | 0.97 | 0.97 | 0.97 | 0.97 | 0.97 | 0.97 | 0.97 | 0.92 |
| 3 | 1.01 | 1.01 | 1.01 | 1.01 | 1.01 | 1.01 | 1.01 | 1.01 | 0.92 |
| 4 | 1.05 | 1.05 | 1.05 | 1.05 | 1.05 | 1.05 | 1.05 | 1.05 | 0.92 |
| 5 | 1.09 | 1.09 | 1.09 | 1.09 | 1.09 | 1.09 | 1.09 | 1.09 | 0.92 |
| 6 | 1.14 | 1.14 | 1.14 | 1.14 | 1.14 | 1.14 | 1.14 | 1.14 | 0.92 |
| 7 | 1.18 | 1.18 | 1.18 | 1.18 | 1.18 | 1.18 | 1.18 | 1.18 | 0.92 |
| 8 | 1.23 | 1.23 | 1.23 | 1.23 | 1.23 | 1.23 | 1.23 | 1.23 | 0.92 |
| 9 | 1.28 | 1.28 | 1.28 | 1.28 | 1.28 | 1.28 | 1.28 | 1.28 | 0.92 |
| 10 | 1.33 | 1.33 | 1.33 | 1.33 | 1.33 | 1.33 | 1.33 | 1.33 | 0.92 |
| 11 | 1.39 | 1.39 | 1.39 | 1.39 | 1.39 | 1.39 | 1.39 | | 0.92 |
| 12 | 1.44 | 1.44 | 1.44 | 1.44 | 1.44 | 1.44 | 1.44 | | 0.92 |
| 13–48 | 1.50 | 1.50 | 1.50 | 1.50 | 1.50 | 1.50 | 1.50 | | 0.92 |

Again, Table 4 provides productivity data by worker years of service and age groups. Age groups are shown for the purpose of illustrating the possibility of using them in the process of this invention. But the only distinction in productivity used in this problem is based on years of service.

Next data based on management policies is added to the database.

Input Data on Management Policies $a_i$=maximum number of employees of type i that can be hired in any year, due to market constraints or as allowed by the management $b_i$=maximum fraction of employees of type i that can be terminated in any year, as allowed by the management or labor agreements (Note that for some employee types termination may not be allowed at all. This can be represented by setting the termination limit $b_i$=0.)

c=minimum average length of service among all employees that is required by the management (This constraint describes the manager's desire to maintain a certain level of "history" or experience in the organization.)

$d_{it}$=maximum headcount on employees of type i in year t that is allowed by the management Tables 5 and 6 show an example set of input data on management policies. As stated above this example contemplates a startup company and, as seen in Tables 5 and 6, the company has an annual hiring limit on both regular and contract employees.

TABLE 5

Input Data on Management Policies - Hiring and Termination Limits and Average Length of Service Requirement

| Policy Parameter | |
|---|---|
| Regular Employee Hiring Limit | 500 |
| Contract Employee Hiring Limit | 5000 |
| Regular Employee Termination Limit | 0.25 |
| Contract Employee Termiantion Limit | 1 |
| Minimum Average Length of Service | 0 |

TABLE 6

Input Data on Management Policies - Headcount Limits

| Planning Period | 1 | 2 | 3 | 4 | 5 | 6 | 7 | 8 | 9 | 10 |
|---|---|---|---|---|---|---|---|---|---|---|
| Maximum Headcount for Regular Employees | 99999 | 99999 | 99999 | 99999 | 99999 | 99999 | 99999 | 99999 | 99999 | 99999 |
| Maximum Headcount for Contract Employees | 99999 | 99999 | 99999 | 99999 | 99999 | 99999 | 99999 | 99999 | 99999 | 99999 |

The values of 99999 in Table 6 mean that that there are no restrictions on headcount in this problem other that those implicit in the annual hiring limitations specified in Table 5.

Input Data on Worker Demographics $p_{ijk}$=survival rate, i.e., the fraction of employees of type i hired while in age group j with k years of service expected to stay on staff in any year $q_{ijk}$=number of employees of type i who were hired while in age group j and have k years of service at the start of the planning period (jump-off population)

$r_{ij}$=fraction of employees of type i that are hired at age j. (Note that for each i, the values of $r_{ij}$ sum to 1.)

Tables 7, 8, and 9 show an example set of input data on worker demographics.

TABLE 7

Input Data on Worker Demographics - Survival or Retention Rates

| Worker Years of Service | Regular Employee Survival Rates Hired at age | | | | | | | | Contract Employee Survival Rates |
|---|---|---|---|---|---|---|---|---|---|
| | 15–19 | 20–24 | 25–29 | 30–34 | 35–39 | 40–44 | 45–49 | 50+ | Hired at any age |
|  | 0.94 | 0.88 | 0.96 | 0.94 | 0.96 | 0.96 | 0.97 | 0.98 | 0.60 |
| 0 | 0.90 | 0.90 | 0.96 | 0.95 | 0.97 | 0.97 | 0.97 | 0.98 | 0.80 |
| 1 | 0.87 | 0.93 | 0.97 | 0.96 | 0.97 | 0.97 | 0.97 | 0.97 | 0.80 |
| 2 | 0.86 | 0.95 | 0.97 | 0.97 | 0.97 | 0.97 | 0.98 | 0.96 | 0.80 |
| 3 | 0.86 | 0.96 | 0.98 | 0.97 | 0.97 | 0.97 | 0.98 | 0.94 | 0.80 |
| 4 | 0.88 | 0.96 | 0.98 | 0.98 | 0.98 | 0.97 | 0.98 | 0.91 | 0.80 |
| 5 | 0.90 | 0.97 | 0.98 | 0.98 | 0.98 | 0.97 | 0.98 | 0.89 | 0.80 |
| 6 | 0.93 | 0.97 | 0.98 | 0.99 | 0.98 | 0.97 | 0.97 | 0.89 | 0.80 |
| 7 | 0.95 | 0.97 | 0.98 | 0.99 | 0.98 | 0.97 | 0.96 | 0.90 | 0.80 |
| 8 | 0.96 | 0.98 | 0.98 | 0.99 | 0.98 | 0.98 | 0.94 | 0.92 | 0.80 |
| 9 | 0.96 | 0.98 | 0.98 | 0.99 | 0.99 | 0.98 | 0.91 | 0.00 | 0.80 |
| 10 | 0.97 | 0.98 | 0.99 | 0.99 | 0.99 | 0.98 | 0.89 | | 0.80 |
| 11 | 0.97 | 0.98 | 0.99 | 0.99 | 0.99 | 0.98 | 0.89 | | 0.80 |
| 12 | 0.97 | 0.98 | 0.99 | 0.99 | 0.99 | 0.97 | 0.90 | | 0.80 |
| 13 | 0.98 | 0.99 | 0.99 | 0.99 | 0.99 | 0.96 | 0.92 | | 0.80 |
| 14 | 0.98 | 0.99 | 0.99 | 0.99 | 0.99 | 0.94 | 0.00 | | 0.80 |
| 15 | 0.98 | 0.99 | 0.99 | 0.99 | 0.98 | 0.91 | | | 0.80 |
| 16 | 0.98 | 0.99 | 0.99 | 0.99 | 0.98 | 0.89 | | | 0.80 |
| 17 | 0.98 | 0.99 | 0.99 | 0.99 | 0.97 | 0.89 | | | 0.80 |
| 18 | 0.99 | 0.99 | 0.99 | 0.99 | 0.96 | 0.90 | | | 0.80 |
| 19 | 0.99 | 0.99 | 0.99 | 0.99 | 0.94 | 0.00 | | | |
| 20 | 0.99 | 0.99 | 0.99 | 0.98 | 0.91 | | | | |
| 21 | 0.99 | 0.99 | 0.99 | 0.98 | 0.90 | | | | |
| 22 | 0.99 | 0.99 | 0.99 | 0.97 | 0.89 | | | | |
| 23 | 0.99 | 0.99 | 0.99 | 0.95 | 0.90 | | | | |
| 24 | 0.99 | 0.98 | 0.98 | 0.91 | 0.00 | | | | |
| 25 | 0.99 | 0.98 | 0.97 | 0.88 | | | | | |
| 26 | 0.99 | 0.98 | 0.96 | 0.86 | | | | | |
| 27 | 0.99 | 0.97 | 0.95 | 0.85 | | | | | |
| 28 | 0.99 | 0.97 | 0.93 | 0.86 | | | | | |
| 29 | 0.98 | 0.97 | 0.90 | 0.00 | | | | | |
| 30 | 0.98 | 0.97 | 0.86 | | | | | | |
| 31 | 0.98 | 0.96 | 0.84 | | | | | | |
| 32 | 0.97 | 0.95 | 0.83 | | | | | | |
| 33 | 0.97 | 0.92 | 0.85 | | | | | | |
| 34 | 0.97 | 0.88 | 0.00 | | | | | | |
| 35 | 0.97 | 0.83 | | | | | | | |
| 36 | 0.96 | 0.80 | | | | | | | |
| 37 | 0.95 | 0.79 | | | | | | | |
| 38 | 0.92 | 0.81 | | | | | | | |
| 39 | 0.88 | 0.00 | | | | | | | |
| 40 | 0.83 | | | | | | | | |
| 41 | 0.80 | | | | | | | | |
| 42 | 0.79 | | | | | | | | |
| 43 | 0.81 | | | | | | | | |
| 44 | 0.85 | | | | | | | | |
| 45 | 0.91 | | | | | | | | |

TABLE 7-continued

Input Data on Worker Demographics - Survival or Retention Rates

| Worker Years of Service | Regular Employee Survival Rates Hired at age | | | | | | | | Contract Employee Survival Rates Hired at any age |
|---|---|---|---|---|---|---|---|---|---|
| | 15–19 | 20–24 | 25–29 | 30–34 | 35–39 | 40–44 | 45–49 | 50+ | |
| 46 | 0.96 | | | | | | | | |
| 47 | 0.00 | | | | | | | | |
| 48 | 0.00 | | | | | | | | |

TABLE 8

Input Data on Worker Demographics - Initial Population

| Worker Years of Service | Regular Employee Initial Population Hired at age | | | | | | | | Contract Employee Initial Population Hired at any age |
|---|---|---|---|---|---|---|---|---|---|
| | 15–19 | 20–24 | 25–29 | 30–34 | 35–39 | 40–44 | 45–49 | 50+ | |
|  | 0 | 0 | 0 | 0 | 0 | 0 | 0 | 0 | 0 |
| 0 | 0 | 0 | 0 | 0 | 0 | 0 | 0 | 0 | 0 |
| 1 | 0 | 0 | 0 | 0 | 0 | 0 | 0 | 0 | 0 |
| 2 | 0 | 0 | 0 | 0 | 0 | 0 | 0 | 0 | 0 |
| 3 | 0 | 0 | 0 | 0 | 0 | 0 | 0 | 0 | 0 |
| 4 | 0 | 0 | 0 | 0 | 0 | 0 | 0 | 0 | 0 |
| 5 | 0 | 0 | 0 | 0 | 0 | 0 | 0 | 0 | 0 |
| 6 | 0 | 0 | 0 | 0 | 0 | 0 | 0 | 0 | 0 |
| 7 | 0 | 0 | 0 | 0 | 0 | 0 | 0 | 0 | 0 |
| 8 | 0 | 0 | 0 | 0 | 0 | 0 | 0 | 0 | 0 |
| 9 | 0 | 0 | 0 | 0 | 0 | 0 | 0 | 0 | 0 |
| 10 | 0 | 0 | 0 | 0 | 0 | 0 | 0 | | 0 |
| 11 | 0 | 0 | 0 | 0 | 0 | 0 | 0 | | 0 |
| 12 | 0 | 0 | 0 | 0 | 0 | 0 | 0 | | 0 |
| 13 | 0 | 0 | 0 | 0 | 0 | 0 | 0 | | 0 |
| 14 | 0 | 0 | 0 | 0 | 0 | 0 | 0 | | 0 |
| 15 | 0 | 0 | 0 | 0 | 0 | 0 | | | 0 |
| 16 | 0 | 0 | 0 | 0 | 0 | 0 | | | 0 |
| 17 | 0 | 0 | 0 | 0 | 0 | 0 | | | 0 |
| 18 | 0 | 0 | 0 | 0 | 0 | 0 | | | 0 |
| 19 | 0 | 0 | 0 | 0 | 0 | 0 | | | 0 |
| 20 | 0 | 0 | 0 | 0 | 0 | | | | |
| 21 | 0 | 0 | 0 | 0 | 0 | | | | |
| 22 | 0 | 0 | 0 | 0 | 0 | | | | |
| 23 | 0 | 0 | 0 | 0 | 0 | | | | |
| 24 | 0 | 0 | 0 | 0 | 0 | | | | |
| 25 | 0 | 0 | 0 | 0 | | | | | |
| 26 | 0 | 0 | 0 | 0 | | | | | |
| 27 | 0 | 0 | 0 | 0 | | | | | |
| 28 | 0 | 0 | 0 | 0 | | | | | |
| 29 | 0 | 0 | 0 | 0 | | | | | |
| 30 | 0 | 0 | 0 | | | | | | |
| 31 | 0 | 0 | 0 | | | | | | |
| 32 | 0 | 0 | 0 | | | | | | |
| 33 | 0 | 0 | 0 | | | | | | |
| 34 | 0 | 0 | 0 | | | | | | |
| 35 | 0 | 0 | | | | | | | |
| 36 | 0 | 0 | | | | | | | |
| 37 | 0 | 0 | | | | | | | |
| 38 | 0 | 0 | | | | | | | |
| 39 | 0 | 0 | | | | | | | |
| 40 | 0 | | | | | | | | |
| 41 | 0 | | | | | | | | |
| 42 | 0 | | | | | | | | |
| 43 | 0 | | | | | | | | |
| 44 | 0 | | | | | | | | |
| 45 | 0 | | | | | | | | |
| 46 | 0 | | | | | | | | |
| 47 | 0 | | | | | | | | |
| 48 | 0 | | | | | | | | |

Table 8 is included to illustrate the type of worker demographic data that could be considered with respect to existing employees at the beginning of an analysis made possible by this invention. Such data is useful in considering attrition rates. However, as stated this example involves a start up situation with no existing engineering designers.

TABLE 9

Input Data on Demographics - Hiring Age Distribution
Fraction of Regular Employees Hired by Age Group

| Hired At Age | | | | | | | |
|---|---|---|---|---|---|---|---|
| 15–19 | 20–24 | 25–29 | 30–34 | 35–39 | 40–44 | 45–49 | 50+ |
| 0.12 | 0.29 | 0.27 | 0.17 | 0.06 | 0.04 | 0.05 | 0.00 |

After receiving the required input data as illustrated above, the programmed computer will then determine simultaneously the optimal values of the following variables:

$y_{it}$=number of employees of type i hired at the start of year t.

$z_{ijkt}$=number of employees of type i who were hired at age j have k years of service who are terminated at the start of year t.

$x_{ijkt}$=the number of employees of type i, hire age j, service length k, on staff during period t.

The computer determines the values for $y_{it}$, $z_{ijkt}$, and $x_{ijkt}$ by solving the following linear programming optimization program using suitable available linear programming analysis software:

$$\text{minimize} \sum_t \sum_i \sum_j \sum_k (c^x_{ijk} x_{ijkt} + c^y_i y_{it} + c^z_{ijk} z_{ijkt})$$

subject to the following constraints:

Constraint 1: The productivity of the all the workers on staff in any given period of the planning horizon must exceed the demand in that year. This can be stated using the mathematical notation as follows:

$$\sum_i \sum_j \sum_k w_{ijk} x_{ijkt} \geq W_t \text{ for all } t \text{ in the set } \{1, \ldots, T\}$$

Constraint 2: The number of employees of any given type who are hired in any given period of the planning horizon must not exceed the hiring limit for that type of employees. This can be stated using the mathematical notation as follows:

$y_{it} \leq a_i$ for all i in the set I and for all t in the set $\{1, \ldots, T\}$ Constraint 3: The fraction of employees of any given type who are terminated in any given period of the planning horizon must not exceed the termination limit for that type of employees. This can be stated using the mathematical notation as follows:

$$b_i \left( \sum_j \sum_k x_{i,j,k,t-1} \right) \geq$$

$$\sum_j \sum_k z_{ijkt} \cdot \text{for all } i \text{ in the set } I \text{ and for all } t \text{ in the set } \{1, \ldots, T\}.$$

Constraint 4: In any given period of the planning horizon, the average length of service over all workers on the staff must be greater than the desired average length of service. This can be stated using the mathematical notation as follows:

$$\frac{\sum_k k \cdot \left( \sum_i \sum_j x_{i,j,k,t} \right)}{\sum_i \sum_j \sum_k x_{i,j,t,t}} \geq c \text{ for all } t \text{ in the set } \{1, \ldots, T\}.$$

Note that the above inequality can easily be put in linear form as is necessary to use standard linear programming analysis software to solve this optimization problem.

Constraint 5: During any given period of the planning horizon, the total headcount for employees of any given type cannot exceed the stated limit. This can be stated using the mathematical notation as follows:

$$\sum_j \sum_k x_{ijkt} \leq d_{it} \cdot \text{for all } i \text{ in the set } I \text{ and for all } t \text{ in the set } \{1, \ldots, T\}.$$

Constraint 6: The number of employees of any given type who are hired in any given period of the planning horizon cannot be less than zero. This can be stated using the mathematical notation as follows:

$y_{it} \geq 0$ for all i in the set I and for all t in the set $\{1, \ldots, T\}$ Constraint 7: In any given period of the planning horizon, the number of employees of any given type who have any given length of service and who were hired while in any given hiring age group cannot be less than zero. This can be stated using the mathematical notation as follows:

$z_{ijkt} \geq 0$ for all i in the set I and for all t in the set $\{1, \ldots, T\}$.

Constraint 8: The number of employees of any given type and any given length of service and who were hired while in any given hiring age group who are on staff in the period before the first period of the planning horizon (t=0) must be equal to the number of employees of said type in said length of service group who were hired in while in said hiring age group that were indicated by the input data to be on staff at the start of the planning horizon. This can be stated using the mathematical notation as follows:

$x_{i,j,k,0} = q_{ijk}$ for all i in the set I, and for all j in the set $\{H^{min}, \ldots, H^{max}\}$, for all k in the set $\{0, \ldots, S\}$ and for all t in the set $\{1, \ldots, T\}$.

Constraint 9: In any given period of the planning horizon, the number of employees of any given type who where hired while in any given hiring age group and have zero years of service is equal to the total number of employees of said type who were hired in said period times the fraction of employees of said type who are hired while in said hiring age group. This can be stated using the mathematical notation as follows:

$x_{i,j,0,t} = y_{it} r_{ij}$ for all i in the set I, and for all j in the set $\{H^{min}, \ldots, H^{max}\}$, and for all t in the set $\{1, \ldots, T\}$.

Constraint 10: In any given period of the planning horizon, the number of employees of any given type who were hired while in any given hiring age group and who have any given length of service greater than zero is equal to the number of employees of said type who were hired while in said hiring age group who were on the staff in the previous period and who had one less year of service in the previous period times the retention rate for employees of said type, said hiring age group and said length of service less one minus the number of employees of said type, said hiring age group, and said length of service less one who were terminated in said period. This can be stated using the mathematical notation as follows:

$x_{ijkt} = x_{i,j,k-1,t-1} p_{ijk} - z_{i,j,k-1,t}$ for all i in the set I, and for all j in the set $\{H^{min}, \ldots, H^{max}\}$, for all k in the set $\{1, \ldots, S\}$ and for all t in the set $\{1, \ldots, T\}$.

This completes the linear programming formulation that is to be solved using linear programming analysis software to determine the number of employees of each type to hire and terminate in each year. Note that many additional policy constraints similar to Constraints 5–8 could easily be added to this linear programming formulation. For example, one could add a constraint limiting the size of the workforce to stay above a certain threshold. Further, the management group is often interested in offering early retirements and career transitions. A revised integer programming formulation that includes career transition and retirement incentives could be included. Other potential constraints which could be added to this formulation are hiring limits that represent labor market supply and policy constraints on the allowable amount of attrition in the organization.

A number of the parameters could be re-indexed. Costs, productivity and policies could all vary by time; the average length of service requirement could vary by employee type; termination limits could vary by length of service, etc. One could also increase the number of indices of the model to capture the skill level of the employees. As is true with any linear program, one might also recast a constraint as an objective to describe a manager's particular situation. For instance, the model could be reformulated to maximize the average experience level of the organization subject to a constraint on total staffing costs. These additions are all straightforward extensions for anyone trained in linear programming.

This model has been implemented in the AT&T Math Programming Language (AMPL) (Fourer, Gay and Kerninghan, AMPL: A Modeling Language for Mathematical Programming. Danvers, Mass., Boyd and Fraser Publishing Company, 1993) and solved for various data sets using the CPLEX® linear programming solver (ILOG, Inc., Using the CPLEX® Callable Library. Incline Village, Nev., ILOG, Inc., 1999). To interface with AMPL, we have developed a Microsoft Excel® user interface that allows the user to enter all the required input data. When the user asks the tool to solve the problem, Microsoft Excel® writes the relevant data to a file which is in a format that can be read by AMPL. We also make a second file available to AMPL which describes the generic linear programming formulation given above (without reference to any specific data). AMPL incorporates the data with the basic linear programming formulation into a complete problem. This problem is solved using the CPLEX® solver. AMPL then writes a file with the minimum-cost plan for the scenario. This minimum-cost plan is pulled into Microsoft Excels® where the user can generate charts and tables summarizing the plan.

The product of this analysis can provide employee type requirements for several planning periods in the future. However, it is recognized that plans and projections change and analytical analyses such as this invention need to be repeated often to reflect such changes. A significant advantage provided by the practice of this invention is that it readily facilitates changes in input data and rerunning of the model to address new situations.

A specific example of the linear programming analysis output of the above specific example is shown in Table 10. The input data for this example was given in Tables 1 through 9. It is recalled that in this example there are two types of employees: full-time contract and full-time regular.

TABLE 10

Linear Programing Output for Specific Example

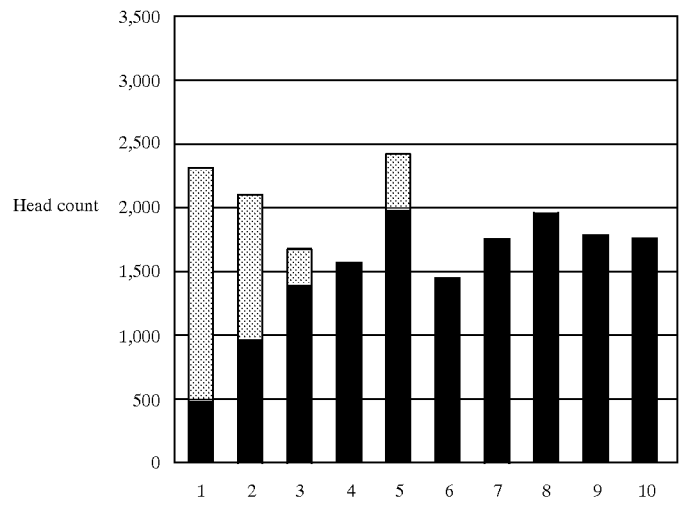

| | Year | 0 | 1 | 2 | 3 | 4 | 5 | 6 | 7 | 8 | 9 | 10 |
|---|---|---|---|---|---|---|---|---|---|---|---|---|
| Regular Staff | Hire | | 500 | 500 | 500 | 264 | 500 | — | 386 | 259 | — | 57 |
| | Terminate | | — | — | — | — | — | 398 | — | — | 62 | — |
| | Quit | | — | 34 | 63 | 86 | 90 | 108 | 77 | 89 | 91 | 73 |
| | Total | 0 | 500 | 966 | 1,403 | 1,580 | 1,990 | 1,485 | 1,794 | 1,964 | 1,811 | 1,795 |

TABLE 10-continued

Linear Programing Output for Specific Example

Optimal Staffing Plan

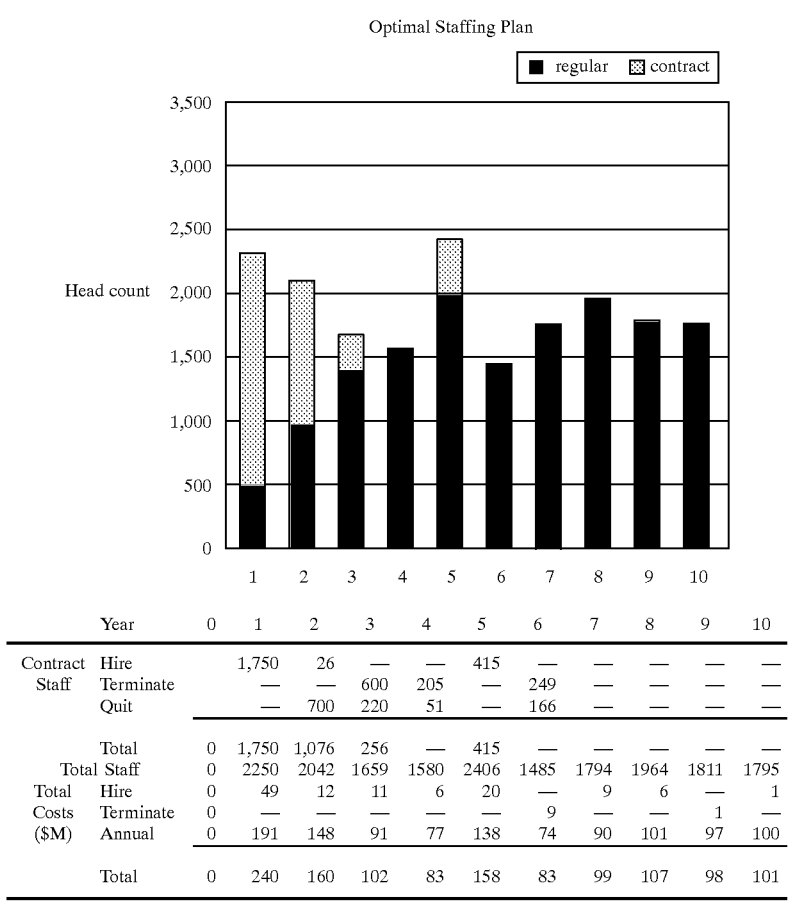

| | Year | 0 | 1 | 2 | 3 | 4 | 5 | 6 | 7 | 8 | 9 | 10 |
|---|---|---|---|---|---|---|---|---|---|---|---|---|
| Contract Staff | Hire | | 1,750 | 26 | — | — | 415 | — | — | — | — | — |
| | Terminate | | — | — | 600 | 205 | — | 249 | — | — | — | — |
| | Quit | | — | 700 | 220 | 51 | — | 166 | — | — | — | — |
| | Total | 0 | 1,750 | 1,076 | 256 | — | 415 | — | — | — | — | — |
| | Total Staff | 0 | 2250 | 2042 | 1659 | 1580 | 2406 | 1485 | 1794 | 1964 | 1811 | 1795 |
| Total Costs ($M) | Hire | 0 | 49 | 12 | 11 | 6 | 20 | — | 9 | 6 | — | 1 |
| | Terminate | 0 | — | — | — | — | — | 9 | — | — | 1 | — |
| | Annual | 0 | 191 | 148 | 91 | 77 | 138 | 74 | 90 | 101 | 97 | 100 |
| | Total | 0 | 240 | 160 | 102 | 83 | 158 | 83 | 99 | 107 | 98 | 101 |

The top portion of Figure 10 shows the number of contract and regular workers that will be used to meet this workload. The lower portion of Figure 10 shows a detailed hiring and termination schedule. This schedule gives the number of employees of each type to hire and terminate in each year of the planning period.

While this invention has been described in terms of a few specific embodiments it is realized that other embodiments of the invention could readily be formulated. Accordingly, the scope of the invention is to be considered limited only by the following claims.

What is claimed is:

1. A method, for implementation on a programmed computer with a database, for determining the number of employees of each of a variety of at least two types that should be utilized by an organization where each worker type has a different employment arrangement, a capability for completing work and a different cost that together affect the overall cost and management prerogatives of the organization, said method comprising;

entering into said computer database data identifying the number of periods of time to be included in the analysis, T, and identifying for each period of time t between 0 and T a worker requirement forecast, $W_t$, where workload changes from period to period, entering into said computer database data identifying each worker type, i, the initial number of employees of each type, $q_i$, the productivity of each said type, $w_i$, and a cost, $c_i$, of each said type, entering into said computer database a retention rate, $p_i$, based on the employment experience of said organization for each worker type, and producing on said computer using linear programming a hiring, $y_{it}$, and termination, $z_{it}$, schedule using the data in said database for each said time period and for workers of each type to both ensure that the total number of workers, $x_{it}$, satisfies the workload requirements and minimizing $$\sum_i \sum_t (c_i x_{it}),$$

subject to the constraints $$\sum_i w_i x_{it} \geq W_t \text{ for all } t \text{ in the set } \{1, \ldots, T\},$$

$y_{it} \geq 0$ for all i in the set of worker types, I, and for all t in the set $\{1, \ldots, T\}$,
  $z_{it} \geq 0$ for all i in the set I and for all t in the set $\{1, \ldots, T\}$,
  $x_{i0} = q_i$ for all i in the set I, and
  $x_{it} = x_{i,t-1} p_i - z_{it}$ for all i in the set I and for all t in the set $\{1, \ldots, T\}$.

2. A method as recited in claim 1 comprising entering into said computer database data identifying the number of periods of time to be included in the analysis, T, and identifying for each period of time t between 0 and T a worker requirement forecast, $W_t$, where workload changes from period to period, entering into said computer database data identifying each worker type, i, the productivity specifically for each combination of worker type and age and length of service group, $w_{ijk}$, and a cost specifically for each combination of worker type and age and length of service group, $c_{ijk}$, entering into said computer database demographic data comprising at least, when known, worker hiring age groups indexed by j where j varies from the youngest age at which employees are hired, $H^{min}$, to the oldest age at which employees are hired, $H^{max}$, and worker length of service groups indexed by k where k varies from 0 to the maximum length of service, S, and data identifying the number of workers of each worker type in each said age and length of service group currently employed by the organization, $q_{ijk}$, entering into said computer database a retention rate, $p_{ijk}$, based on the employment experience of said organization, for each combination of worker type and age and length of service group, entering into said computer database data for each worker type i indicating the fraction of employees, $r_{ij}$, of that type who are hired at age j, and producing on said computer using linear programming a hiring, $y_{it}$, and termination, $z_{ijkt}$, schedule using the data in said database for each said time period and for workers of each type to both ensure that the total number of workers, $x_{ijkt}$, satisfies the workload requirements and minimizing $$\sum_i \sum_j \sum_k \sum_t (c_{ijk} x_{ijkt}),$$

subject to the constraints $$\sum_i \sum_j \sum_k w_{ijk} x_{ijkt} \geq W_t \text{ for all } t \text{ in the set } \{1, \ldots, T\},$$

$y_{it} \geq 0$ for all i in the set of worker types, I, and for all t in the set $\{1, \ldots, T\}$, $z_{ijkt} \geq 0$ for all i in the set I, for all j in the set $\{H^{min}, \ldots, H^{max}\}$, for all k in the set $\{0, \ldots, S\}$ and for all t in the set $\{1, \ldots, T\}$, $x_{i,j,k,0} = q_{ijk}$ for all i in the set I, for all j in the set $\{H^{min}, \ldots, H^{max}\}$, and for all k in the set $\{0, \ldots, S\}$, $x_{i,j,0,t} = y_{it} r_{it}$ for all i in the set I, and for all j in the set $\{H^{min}, \ldots, H^{max}\}$, and for all t in the set $\{1, \ldots, T\}$, and $x_{ijkt} = x_{i,j,k-1,t-1} p_{ijk} - z_{i,j,k-1,t}$ for all i in the set I, and for all j in the set $\{H^{min}, \ldots, H^{max}\}$, for all k in the set $\{1, \ldots, S\}$ and for all t in the set $\{1, \ldots, T\}$.

3. A method as recited in claim 1 comprising entering into said computer database data identifying the number of periods of time to be included in the analysis, T, and identifying for each period of time t between 0 and T a worker requirement forecast, $W_t$, where workload changes from period to period, entering into said computer database data identifying each worker type, i, the initial number of employees of each type, $q_i$, the productivity of each said type, $w_i$, the training cost of each worker type, $c^y_i$, the annual cost of each worker type, $c^x_i$, and the termination cost of each worker type, $c^z_i$, entering into said computer database a retention rate, $p_i$, based on the employment experience of said organization for each worker type, and producing on said computer using linear programming a hiring, $y_{it}$, and termination, $z_{it}$, schedule using the data in said database for each said time period and for workers of each type to both ensure that the total number of workers, $x_{it}$, satisfies the workload requirements and minimizing $$\sum_t \sum_i (c^x_i x_{it} + c^y_i y_{it} + c^z_i z_{it}),$$

subject to the constraints $$\sum_i w_i x_{it} \geq W_t \text{ for all } t \text{ in the set } \{1, \ldots, T\},$$

$y_{it} \geq 0$ for all i in the set of worker types, I, and for all t in the set $\{1, \ldots, T\}$, $z_{it} \geq 0$ for all i in the set I and for all t in the set $\{1, \ldots, T\}$, $x_{i0} = q_i$ for all i in the set I and $x_{it} = x_{i,t-1} p_i - z_{it}$ for all i in the set I and for all t in the set $\{1, \ldots, T\}$.

4. A method as recited in claim 1 comprising entering into said computer database data identifying the number of periods of time to be included in the analysis, T, and identifying for each period of time t between 0 and T a worker requirement forecast, $W_t$, where workload changes from period to period, entering into said computer database data identifying each worker type i, entering into said computer database demographic data comprising at least, when known, worker hiring age groups indexed by j where j varies from the youngest age at which employees are hired, $H^{min}$, to the oldest age at which employees are hired, $H^{max}$, and worker length of service groups indexed by k where k varies from 0 to the maximum length of service, S, and data identifying the number of workers of each worker type in each said age and length of service group currently employed by the organization, $q_{ijk}$, entering into said computer database a retention rate, $p_{ijk}$, based on the employment experience of said organization, for each combination of worker type and age and length of service group, entering data into said computer database identifying the productivity for each combination of worker type and age and length of service group, $w_{ijk}$, the training cost for each worker type, $c^y_i$, the annual cost for each combination of worker type and age and length of service group, $c^x_{ijk}$, and the termination cost for each combination of worker type and age and length of service group, $c^z_{ijk}$, entering into said computer database data for each worker type i indicating the fraction of employees, $r_{ij}$, of that type who are hired at age j, and producing on said computer using linear programming a hiring, $y_{it}$, and termination, $z_{ijkt}$, schedule using the data in said database for each said time period and for workers of each type to both ensure that the total number of workers, $x_{ijkt}$, satisfies the workload requirements and minimizing $$\sum_t \sum_i \sum_j \sum_k (c^x_{ijk} x_{ijkt} + c^y_i y_{it} + c^z_{ijk} z_{ijkt}),$$

subject to the constraints $$\sum_i \sum_j \sum_k w_{ijk} x_{ijkt} \geq W_t \text{ for all } t \text{ in the set } \{1, \ldots, T\},$$

$y_{it} \geq 0$ for all i in the set of worker types, I, and for all t in the set $\{1, \ldots, T\}$, $z_{ijkt} \geq 0$ for all i in the set I, for all j in the set $\{H^{min}, \ldots, H^{max}\}$, for all k in the set $\{0, \ldots, S\}$ and for all t in the set $\{1, \ldots, T\}$, $x_{i,j,k,0} = q_{ijk}$ for all i in the set I, for all j in the set $\{H^{min}, \ldots, H^{max}\}$, and for all k in the set $\{0, \ldots, S\}$, $x_{i,j,0,t} = y_{it} r_{ij}$ for all i in the set I, and for all j in the set $\{H^{min}, \ldots, H^{max}\}$, and for all t in the set $\{1, \ldots, T\}$, and $x_{ijkt} = x_{i,j,k-1,t-1} p_{ijk} - z_{i,j,k-1,t}$ for all i in the set I, and for all j in the set $\{H^{min}, \ldots, H^{max}\}$, for all k in the set $\{1, \ldots, S\}$ and for all t in the set $\{1, \ldots, T\}$.

5. A method as recited in claim 1 a method as recited in claim 4 comprising entering into said computer database data identifying the number of periods of time to be included in the analysis, T, and identifying for each period of time t between 0 and T a worker requirement forecast, $W_t$, where workload changes from period to period, entering into said computer database data identifying each worker type, i, entering into said computer database demographic data comprising at least, when known, worker hiring age groups indexed by j where j varies from the youngest age at which employees are hired, $H^{min}$, to the oldest age at which employees are hired, $H^{max}$, and worker length of service groups indexed by k where k varies from 0 to the maximum length of service, S, and data identifying the number of workers of each worker type in each said age and length of service group currently employed by the organization, $q_{ijk}$, entering into said computer database a retention rate, $p_{ijk}$, based on the employment experience of said organization, for each combination of worker type and age and length of service group, entering data into said computer database identifying the productivity specifically for each combination of worker type and age and length of service group, $w_{ijk}$, and a cost specifically for each combination of worker type and age and length of service group, $c_{iji}$, entering into said computer database data for each worker type i indicating the fraction of employees, $r_{ij}$, of that type who are hired at age j, entering into said computer database the training cost for each work type, $c^y_i$, the annual cost for each combination of worker type and age and length of service group, $c^x_{ijk}$, and the termination cost of each worker type, $c^z_{ijk}$, entering into said computer database data on management policies including the maximum number of employees of any given type i that can be hired in a single period, $a_i$, the maximum fraction of employees of type i that management is willing to terminate in a single period, $b_i$, the minimum length of service across the organization that the management is willing to tolerate, c, and the maximum number of employees of type i that the management is willing to include on the staff in period t, $d_{it}$, and producing on said computer using linear programming a hiring, $y_{it}$, and termination, $z_{ijkt}$, schedule using the data in said database for each said time period and for workers of each type to both ensure that the total number of workers, $x_{it}$, satisfies the workload requirements and minimizing $$\sum_t \sum_i \sum_j \sum_k (c^x_{ijk} x_{ijkt} + c^y_i y_{it} + c^z_{ijk} z_{ijkt}),$$

subject to the constraints $$\sum_i \sum_j \sum_k \sum_t w_{ijk} x_{ijkt} \geq W_t \text{ for all } t \text{ in the set } \{1, \ldots, T\},$$

$y_{it} \geq 0$ for all i in the set of worker types, I, and for all t in the set $\{1, \ldots, T\}$, $z_{ijkt} \geq 0$ for all i in the set I, for all j in the set $\{H^{min}, \ldots, H^{max}\}$, for all k in the set $\{0, \ldots, S\}$ and for all t in the set $\{1, \ldots, T\}$, $x_{i,j,k,0} = q_{ijk}$ for all i in the set I, for all j in the set $\{H^{min}, \ldots, H^{max}\}$, and for all k in the set $\{0, \ldots, S\}$, $x_{i,j,0,t} = y_{it} r_{ij}$ for all i in the set I, and for all j in the set $\{H^{min}, \ldots, H^{max}\}$, and for all t in the set $\{1, \ldots, T\}$, $x_{ijkt} = x_{i,j,k-1,t-1} p_{ijk} - z_{i,j,k-1,t}$ for all i in the set I, and for all j in the set $\{H^{min}, \ldots, H^{max}\}$, for al 1 k in the set $\{1, \ldots, S\}$ and for all t in the set $\{1, \ldots, T\}$, $y_{it} \leq a_i$, for all i in the set I and for all t in the set $\{1, \ldots, T\}$, $$b_i \left( \sum_j \sum_k x_{i,j,k,t-1} \right) \geq \sum_j \sum_k z_{ijkt} \text{ for all } i \text{ in the set } I \text{ and for all } t \text{ in the set } \{1, \ldots, T\},$$

$$\frac{\sum_k k \cdot \left( \sum_i \sum_j x_{i,j,k,t} \right)}{\sum_i \sum_j \sum_k x_{i,j,k,t}} \geq c \text{ for all } t \text{ in the set } \{1, \ldots, T\}, \text{ and}$$

$$\sum_j \sum_k x_{ijkt} \leq d_{it} \text{ for all } i \text{ in the set } I \text{ and for all } t \text{ in the set } \{1, \ldots, T\}.$$

* * * * *